June 3, 1924.                      1,496,403
W. ATKINSON
SUNDIAL
Filed April 30, 1923

Patented June 3, 1924.

1,496,403

UNITED STATES PATENT OFFICE.

WILL ATKINSON, OF CAPON SPRINGS, WEST VIRGINIA.

SUNDIAL.

Application filed April 30, 1923. Serial No. 635,418.

*To all whom it may concern:*

Be it known that I, WILL ATKINSON, a citizen of the United States, residing at Capon Springs, in the county of Hampshire and State of West Virginia, have invented certain new and useful Improvements in Sundials, of which the following is a specification.

This invention relates to horological instruments and has particular reference to sun dials or like instruments useful for indicating with a considerable degree of precision the time of day with reference to the sunlight.

Among the objects of the invention is to provide an accurate sun dial so designed and constructed as to be cheap in construction and cost, easily transported in thin condition or position and which will occupy practically no appreciable amount of room in the traveler's kit or knapsack.

While this sun dial has been devised for particular use by boy scouts, for whose use it is most suitable because of its cheapness and lightness as well as accuracy, yet it is to be understood that its field of usefulness is not to be so circumscribed, for obviously it may be used by anyone whether a traveler or not.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
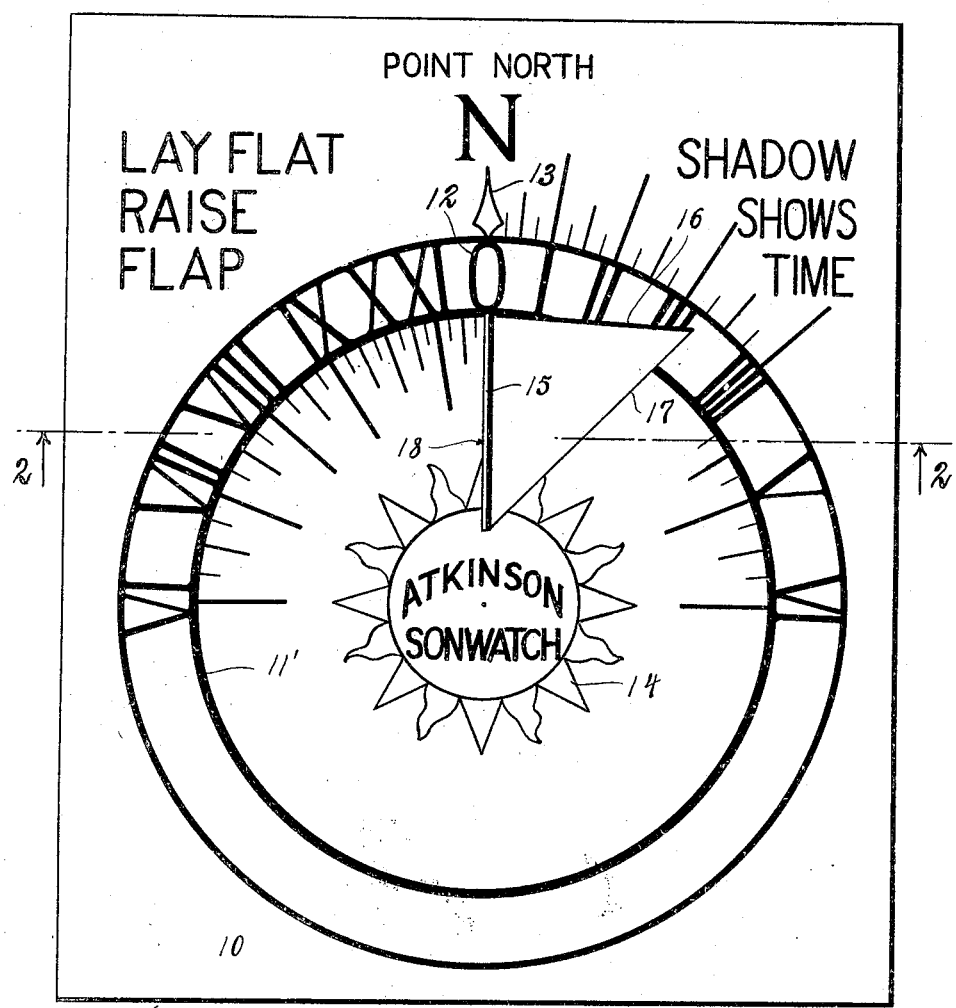
Figure 1 is a plan view of the invention in operative position.
Figure 2:
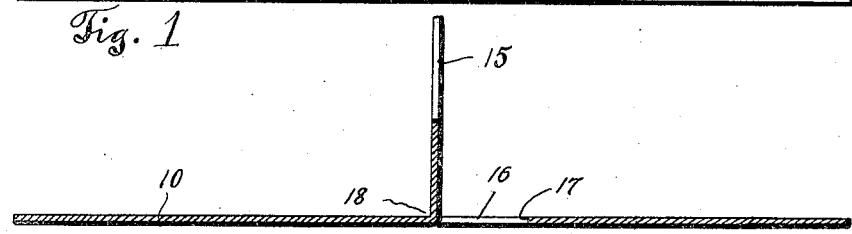
Fig. 2 is a transverse section on the line 2—2 of Fig. 1.

Referring now more specifically to the drawings, 10 indicates a sheet of thin material of any suitable thin and tough or strong material such as paper, sheet metal or other suitable substance, the same having stamped or otherwise printed or painted upon its upper surface the dial 11 comprising two parallel concentric arcs of circles extending in opposite directions from a mid or zero point 12 adjacent to which is a pointer 13 which is presumed in use to be pointed toward the north. It is well known that the training for a boy scout, for example, includes the determination of the points of a compass with a fair degree of accuracy even though he may not be supplied with a pocket compass. As sun dials have heretofore been commonly made, the thin dial is provided with two series of numerals on opposite sides of the zero point corresponding to times in the afternoon and forenoon together with fractional subdivisions of the hours.

In the center of the dial is arranged an attractive figure 14 representing a glowing sun and on the sheet or plate outside of the dial circles are arranged groups of words giving the simple directions for the use of the device, a matter of considerable importance in view of the use for which the device is to be put.

The gnomon 15 is produced by the formation of a triangular member directly from the sheet, the sheet being slitted at 16 and 17 forming two sides of the triangular member which is bendable into a vertical plane around the side 18 which coincides with the radius passing through the zero point. The side of the gnomon corresponding to the slit 17, when the gnomon is in vertical position, is that element of the device which in producing the shadow of the sun on one or the other of the two series of figures indicates the time of day. From the nature of the material employed the gnomon is formed during the manufacture of the instrument and when it is to be used the gnomon is simply turned upward to vertical position ready for use and after which use it may be restored to its flat position again while the instrument is carried in the pocket or knapsack.

I claim:

The herein described device for telling time by the sun's shadow, the same comprising a plate of sheet material having a dial with indications of hours and fractions of hours thereon and having a gnomon for the casting of a shadow across the dial formed as a section of the sheet and bent upward from the plane thereof into a plane perpendicular to the sheet.

In testimony whereof I affix my signature.

WILL ATKINSON.